Figure 1:
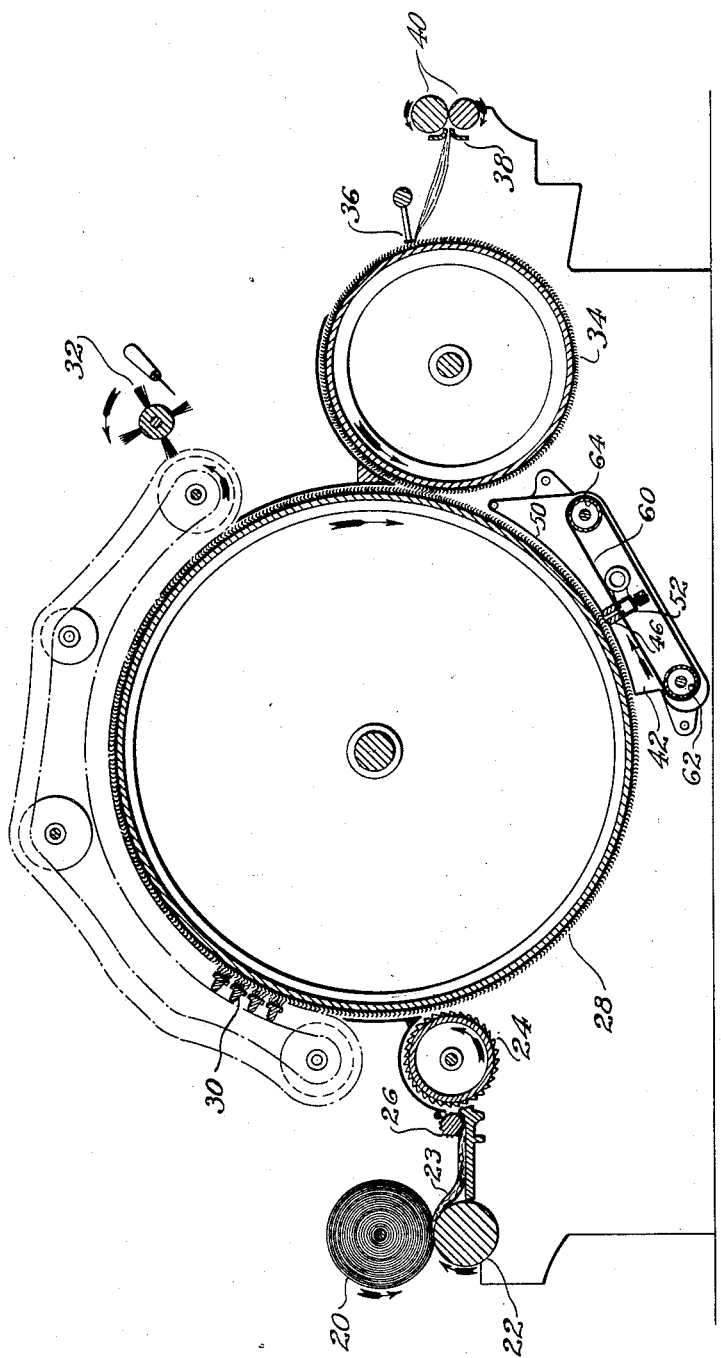

Aug. 24, 1943. W. H. GOLDSMITH, JR 2,327,349
METHOD AND MEANS FOR STRIPPING CARDING APPARATUS
Filed March 11, 1939 8 Sheets-Sheet 1

Witness
Paul F. Bryant

Inventor
William H. Goldsmith Jr.
by his attorneys
Fish Hildreth Carey & Jenney

Aug. 24, 1943.　　　W. H. GOLDSMITH, JR　　　2,327,349
METHOD AND MEANS FOR STRIPPING CARDING APPARATUS
Filed March 11, 1939　　　8 Sheets-Sheet 2
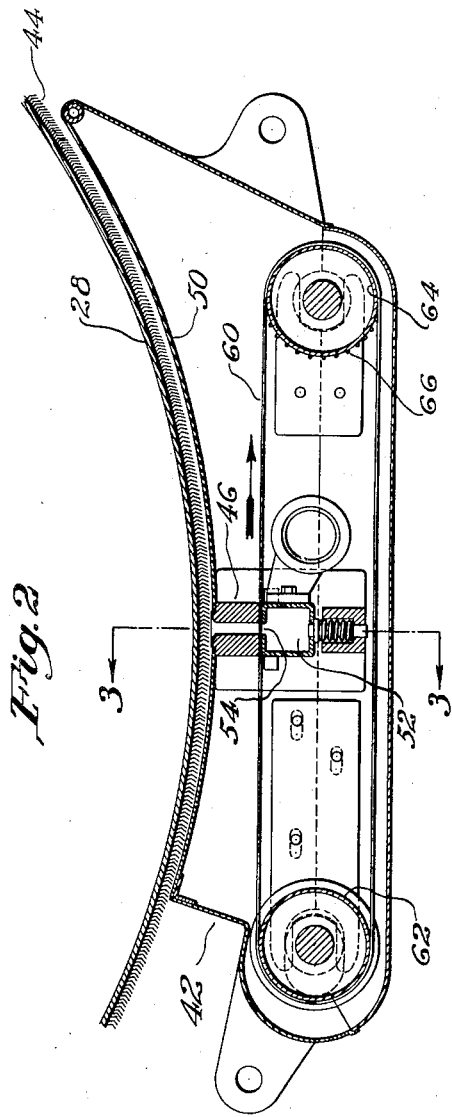
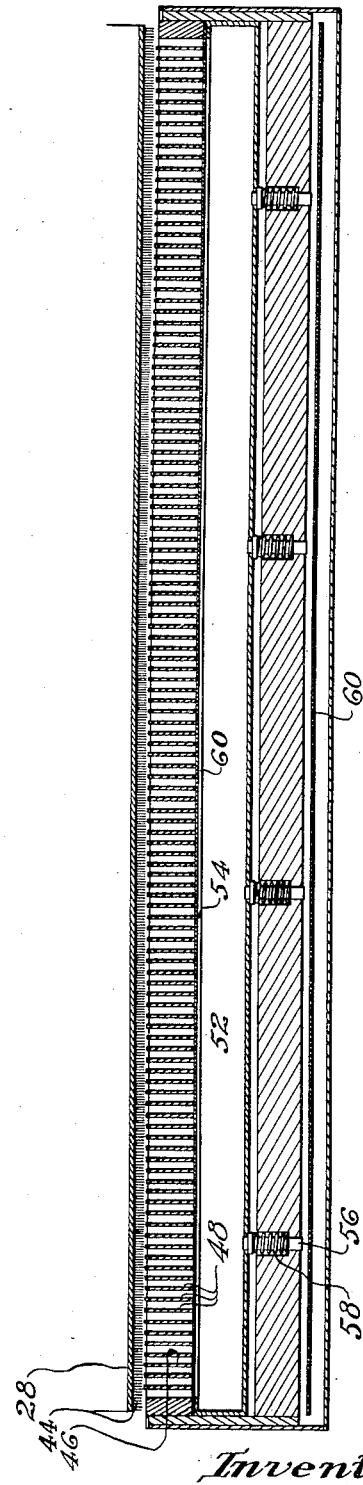
Witness
Paul F. Bryant
Inventor
William H. Goldsmith Jr.
By his Attorneys
Fish Hildreth Carey & Jenney Aug. 24, 1943.   W. H. GOLDSMITH, JR   2,327,349
METHOD AND MEANS FOR STRIPPING CARDING APPARATUS
Filed March 11, 1939   8 Sheets-Sheet 3

Witness
Paul F. Bryant

Inventor
William H. Goldsmith Jr.
by his attorneys
Fish Hildreth Cary & Jurney

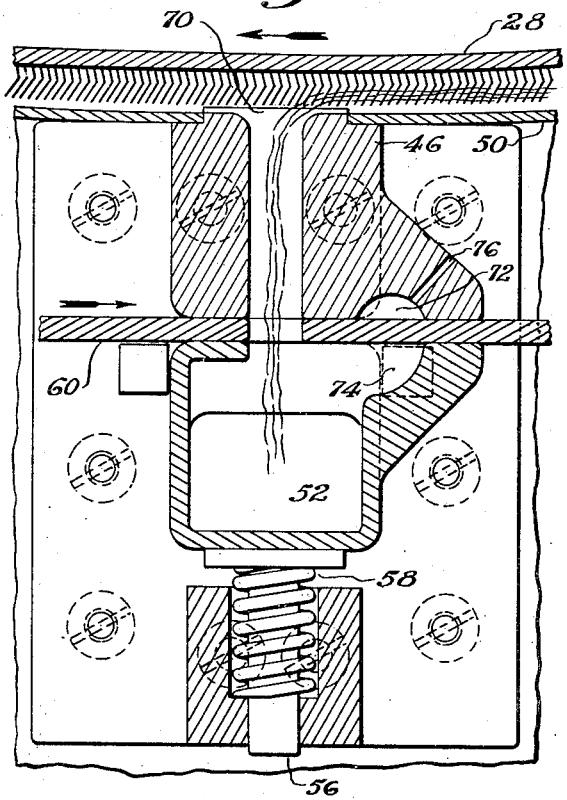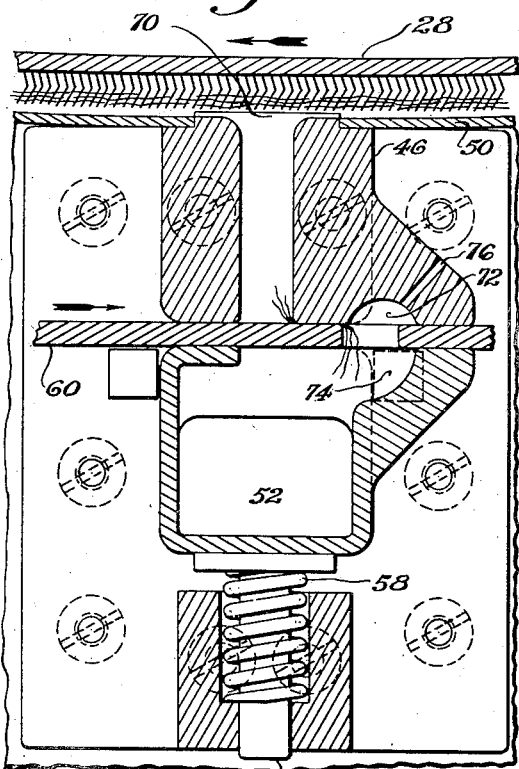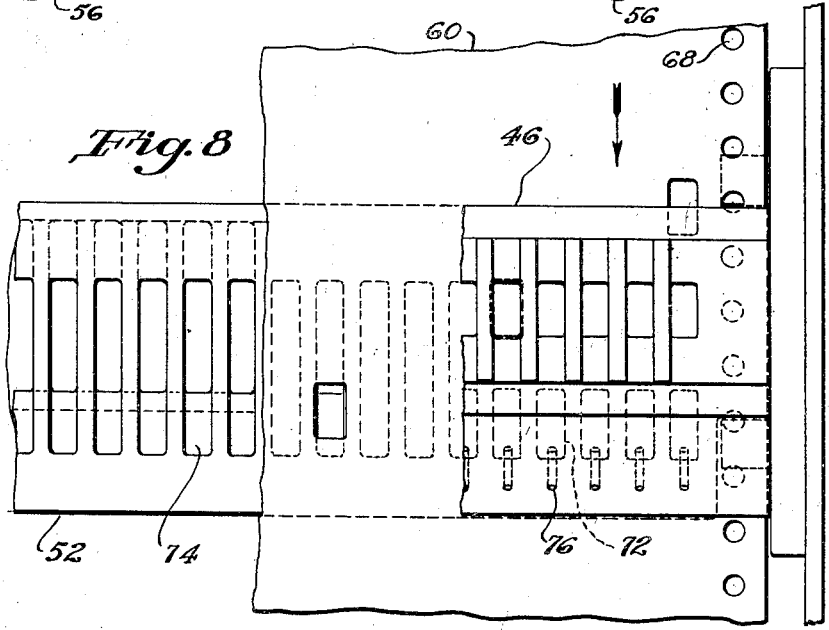

Aug. 24, 1943.　　W. H. GOLDSMITH, JR　　2,327,349
METHOD AND MEANS FOR STRIPPING CARDING APPARATUS
Filed March 11, 1939　　8 Sheets-Sheet 5
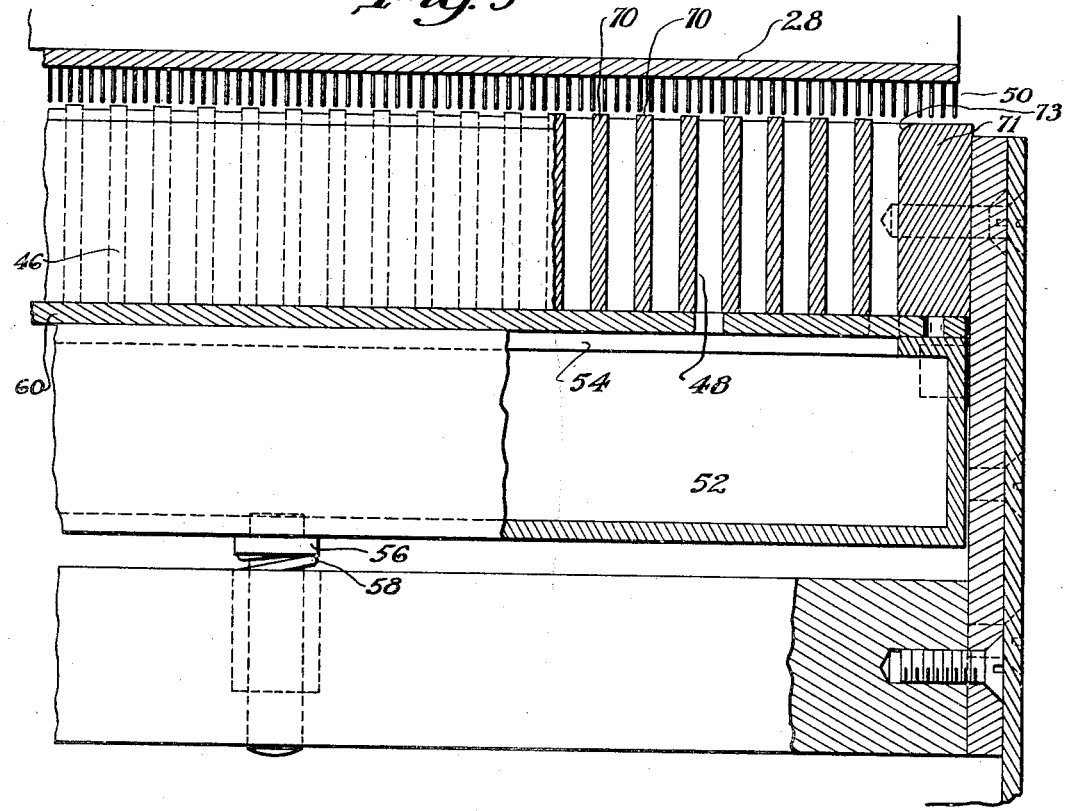
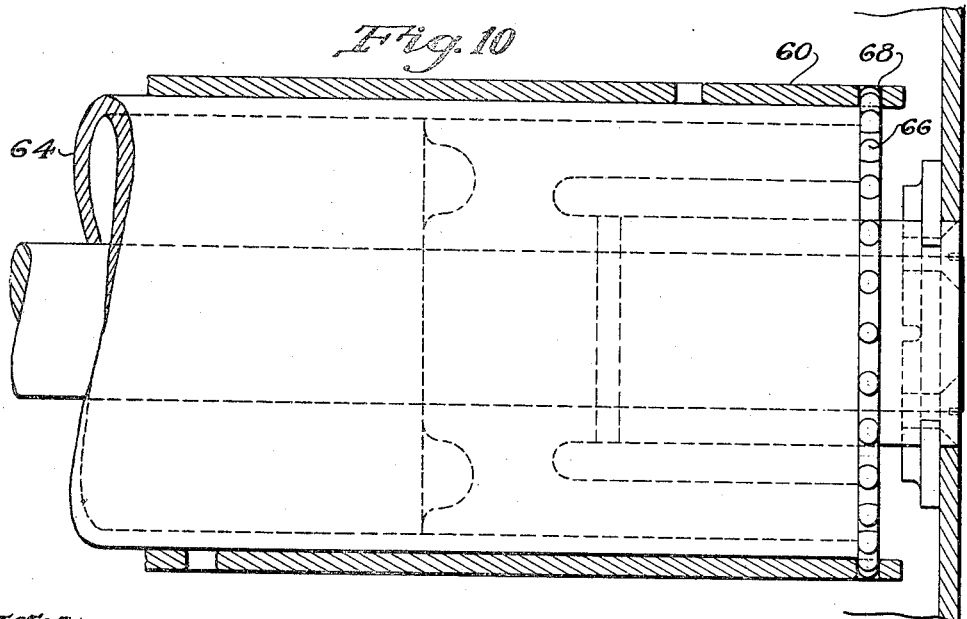
Witness
Paul F. Bryant
Inventor
William H. Goldsmith Jr.
by his attorneys Aug. 24, 1943.  W. H. GOLDSMITH, JR  2,327,349
METHOD AND MEANS FOR STRIPPING CARDING APPARATUS
Filed March 11, 1939  8 Sheets-Sheet 8

Witness
Paul F. Bryant

Inventor
William H. Goldsmith Jr.
By his Attorneys

Patented Aug. 24, 1943

2,327,349

UNITED STATES PATENT OFFICE 2,327,349

METHOD AND MEANS FOR STRIPPING CARDING APPARATUS

William H. Goldsmith, Jr., Brookline, Mass., assignor to Abington Textile Machinery Works, Boston, Mass., a trust of Massachusetts Application March 11, 1939, Serial No. 261,266

16 Claims. (Cl. 19—109)

The present invention relates to a method and apparatus for stripping or cleaning the card clothed cylinders of cards and the like, and is more particularly concerned with the cleaning of such cylinders in a manner to permit uninterrupted operation of the cylinders at normal output.

Card and doffer cylinders are effectively cleaned of the residual fibre collected thereon by vacuum stripping apparatus which is employed periodically during the normal run of the card to substantially remove from the carding teeth and strip the cylinder of the residue of textile fibre gradually collected thereon and impacted in such a fashion that it is not doffed in the normal operation of the card. This operation under skilled supervision and with the proper attention works reasonably well and has been universally adopted wherever carding operations are in general use. However, this type of intermittent stripping has certain inherent disadvantages which it is extremely desirable to obviate if possible, first because the stripping operation depends on the human element and the care and regularity with which it is carried out. As production of the card ceases during stripping, and as a certain portion of the sliver delivered upon resumption of operation of the card is faulty and perhaps unusable, there is a distinct temptation to avoid stripping and cleaning the cards for periods which are unduly long. This delay causes the building up of an impacted layer or mat of fibres extending to the roots of the carding teeth, which not only require considerable power for their removal, whether by vacuum stripping or otherwise, but due to the impacting of dirt and foreign matter within the fibrous mass, the recovered fibre cannot be adequately cleaned, and in consequence is considered by the textile operator as virtually a waste product having a minimum value. A further disadvantage of lengthening the intervals between cleaning is due to the progressive deterioration in efficiency of the card as the build-up of the residual mat increases, not only reducing the output by weight of the card, but varying the unit weight and density of the delivered sliver, the reasonably accurate control of which is an important aspect of this type of operation.

The purpose of the present invention is to completely obviate the above-described disadvantages of intermittent card stripping, and to produce a method and apparatus for cleaning the cards which independently of the human element results in the delivery of a constantly uniform card sliver with a permanent maintenance of the carding cylinder free from excessive or abnormal build-up of residual textile fibres.

With this general purpose in mind, I have discovered that by successively removing from the card and the doffer cylinders relatively small increments of fibrous mat preferably in the form of circumferential strips, leaving furrows in the complete mat, and by spacing each furrow substantially from the next preceding furrow to insure that each circumferential strip shall be taken from the solid body of the fibrous mat without interference with or overlapping or withdrawing from the previously formed furrow, continuous stripping of the cylinders may be carried on without interference with the normal production of the card. The narrow circumferential strips removed during each pass circumferentially of the cylinder are insufficient to interfere with the continuous production of the web, and as stated hereinafter in the specification, account for one percent or less of the total volume of fibrous mat on the cylinder. In connection with this method I prefer to work outwardly from the center toward the edges of the mat, successive strips being removed laterally from opposite sides of the center line of the mat, and progressing outwardly in opposite directions. I have found that by such a method controlled from the standpoint that strips shall always be removed from an endless lap and sufficiently spaced from adjacent furrows which have not had an opportunity to refill, there is no interference with the delivered production web and no variation in weight or density, as the removal is substantially continuous and uniform in amount.

This method of stripping removes what might be termed the residual collection of fibres in a comparatively loose fluffy condition before such fibres have become impacted in a mass, and in such a physical form that any dirt or foreign matter combined therewith may be readily separated. Furthermore, this method insures continuous removal of the residue and the maintenance of the carding teeth in a condition of highest efficiency.

In the simplest and most efficient form of the invention which I have yet devised, I find that the continuous removal of a circumferential strip leaving a resulting furrow is conveniently accomplished through the use of a suction device having an opening or mouth closely adjacent to the teeth of the cylinder, and preferably of such an area as to operate throughout a minimum width or area which will permit the removed fibres to pass freely therethrough into the suction conduit. This suction member is so operated that after the removal of a complete furrow in one position, it is then directed to the removal of a strip substantially removed therefrom, with successive strips likewise spaced from the preceding strip following a predetermined pattern until the complete width of the mat has been so acted upon. As the area subjected to suction is small, and as only a single strip is removed at one time, the power necessary to accomplish this continuous stripping function may be maintained at a minimum, and is incomparably smaller than the power requirements for the usual intermittent and sporadic stripping operation where it is desirable because of the inoperativeness of the card to strip the complete cylinder in a minimum of time.

The apparatus which I employ for carrying out this operation consists in certain novel combinations and arrangements of parts, and will be more fully described hereinafter in the specification and defined in the appended claims.

Figures 4, 5:
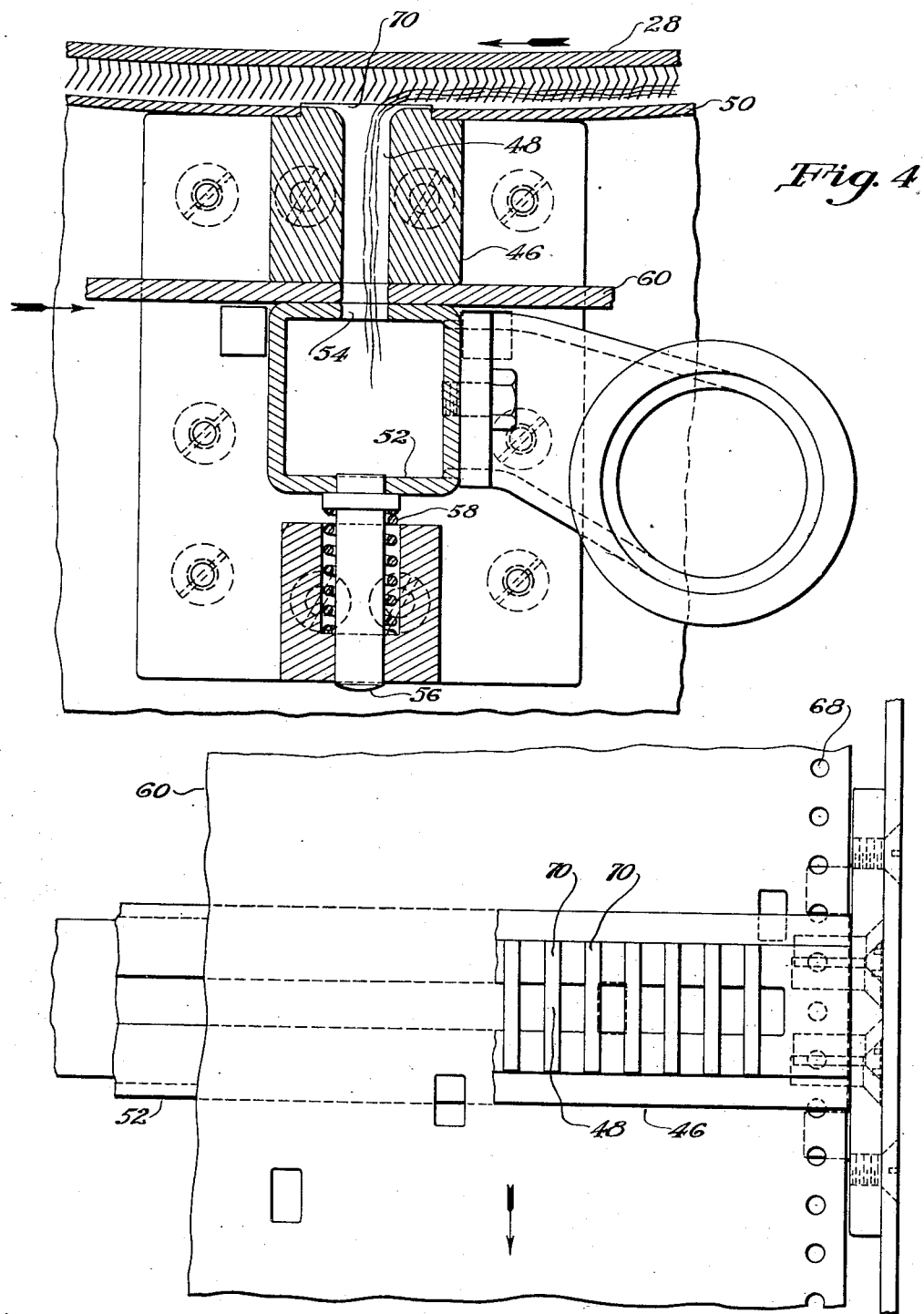
Figure 11:
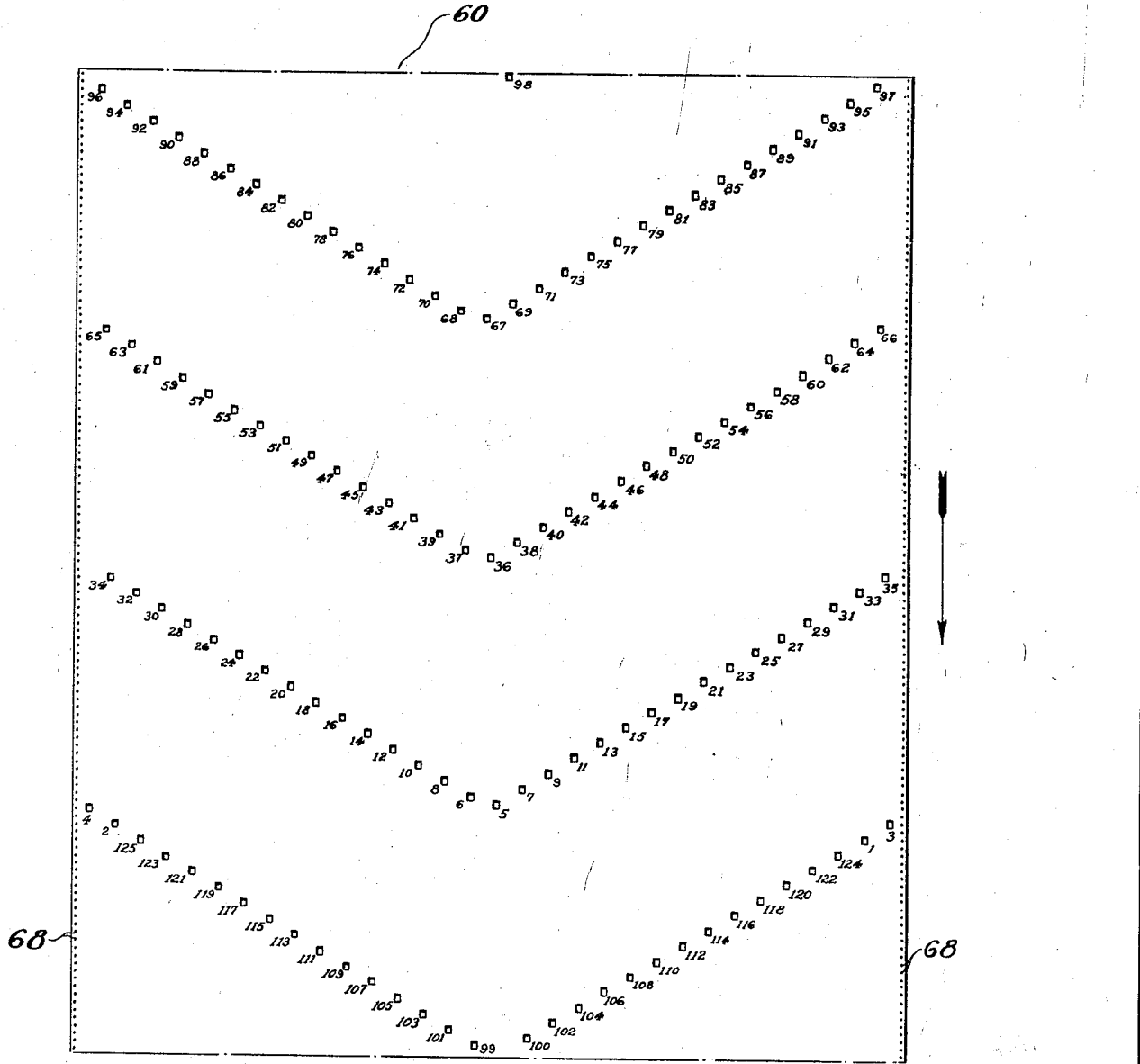
Figure 12:
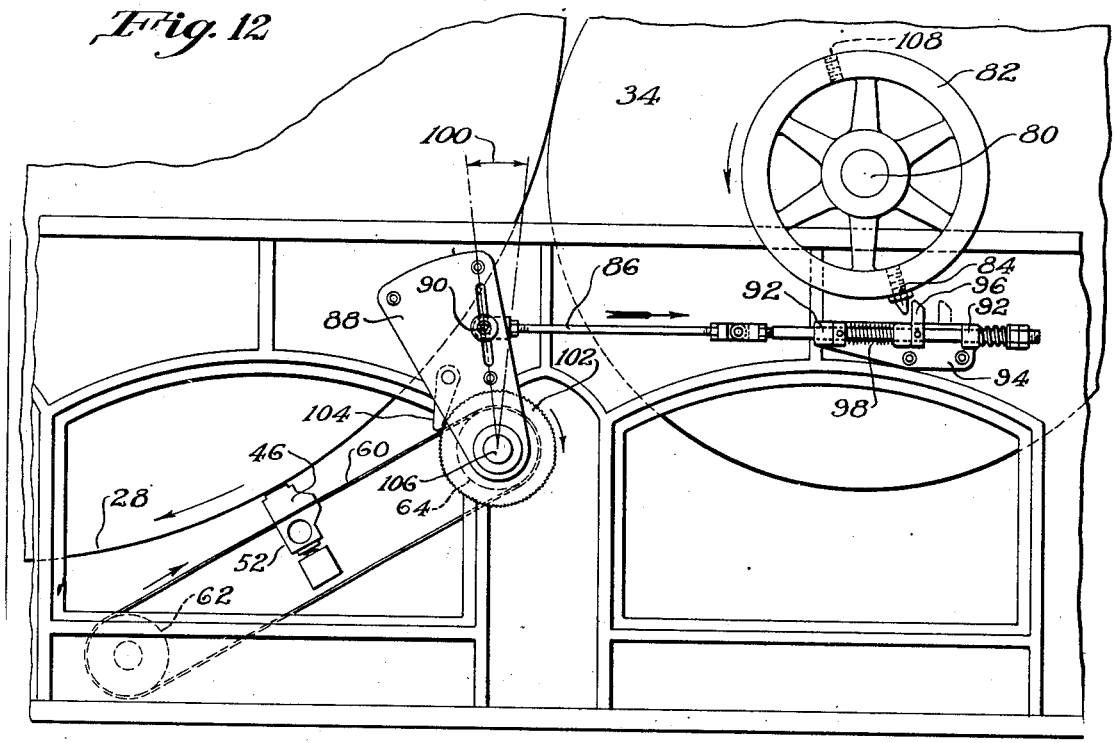
Figure 13:
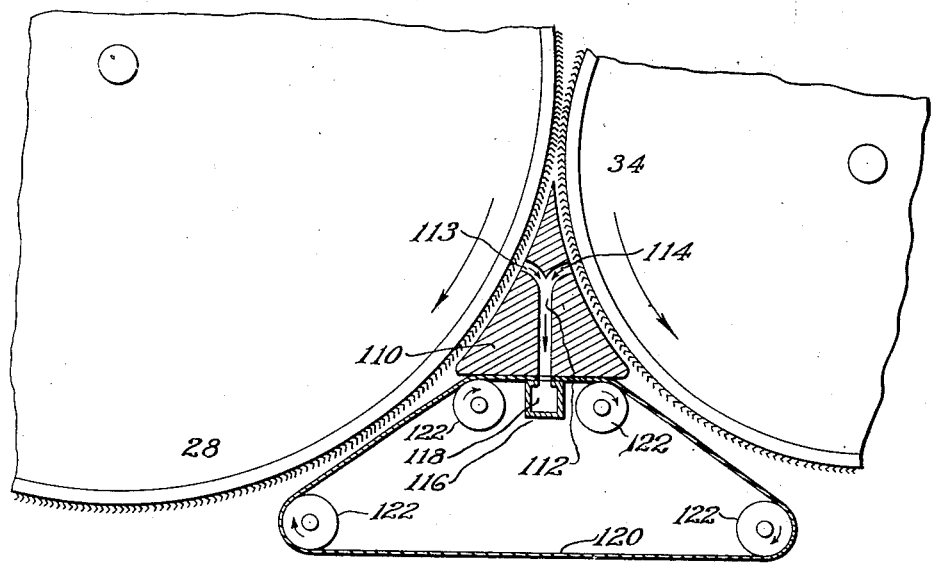
Figure 14:
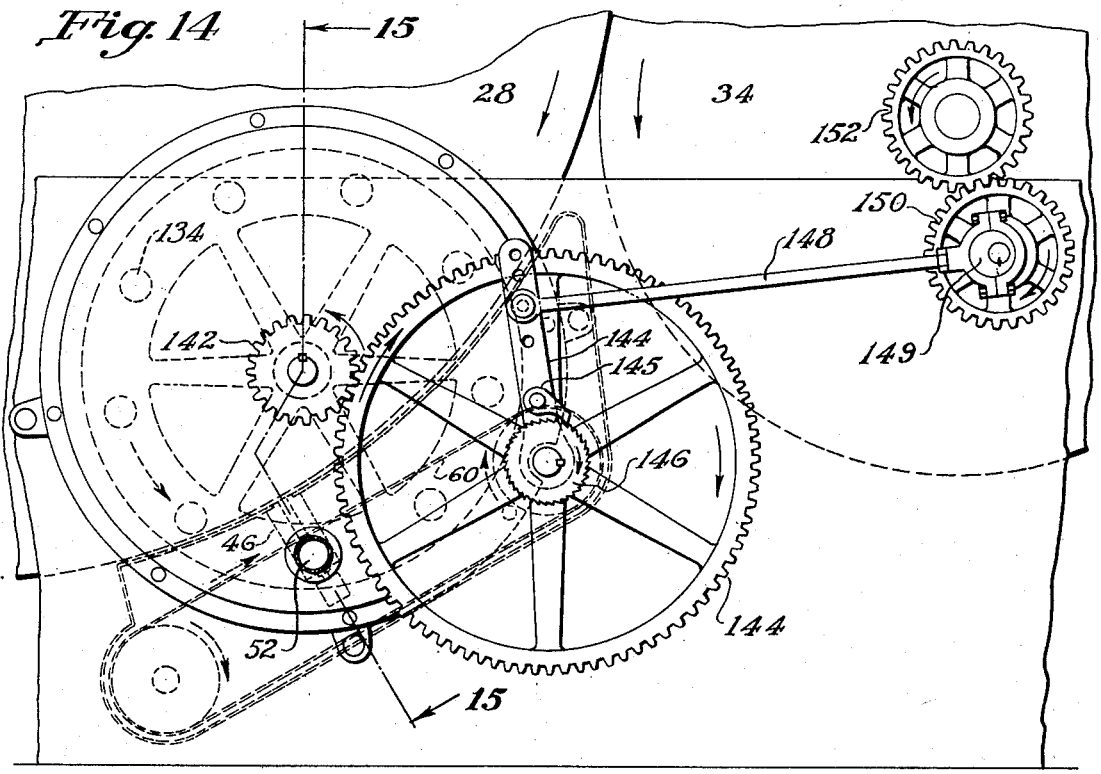
Figure 15:
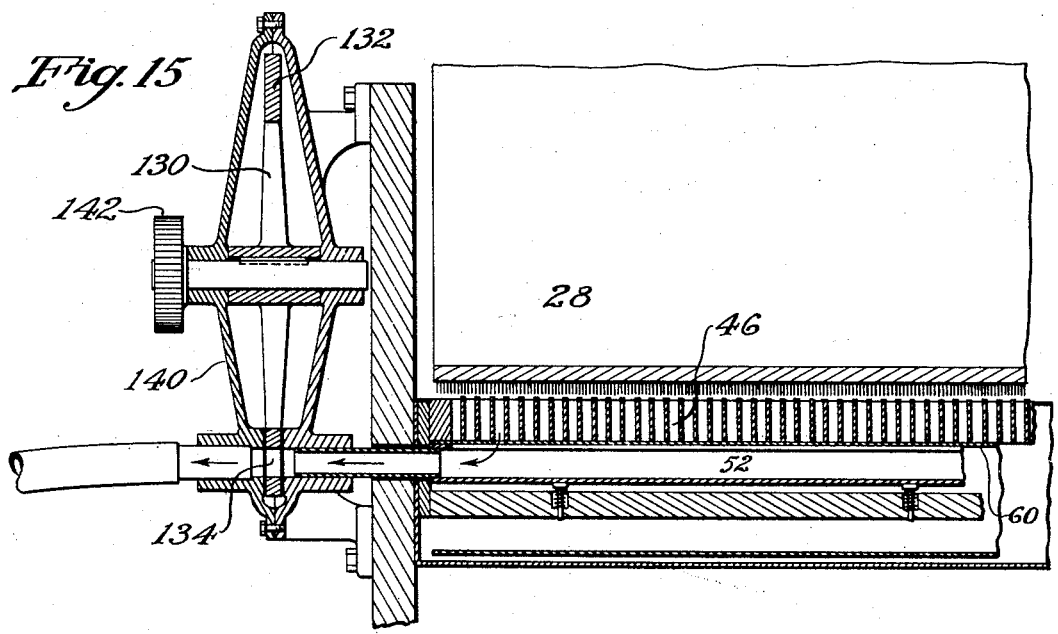

In the accompanying drawings illustrating the preferred form of the invention, Fig. 1 illustrates a partially diagrammatic longitudinal section of a standard cotton card illustrating the application of the continuous stripper thereto; Fig. 2 is a detail illustrating a cross-section of the stripper in operation on the teeth of the card cylinder; Fig. 3 is a section at right angles to Fig. 2, showing the lengthwise position of the stripper extending across the card cylinder; Fig. 4 is a section of the stripper nozzle upon an enlarged scale; Fig. 5 is a detail showing a plan view of the stripper comb and control belt cooperating therewith; Figs. 6 and 7 are details illustrating a slight modification of the stripper nozzle shown in Fig. 4; Fig. 8 is a view similar to Fig. 5, illustrating the same modification; Fig. 9 is a detail illustrating the yieldable supports of the manifold and the relationship of the belt and nozzle comb; Fig. 10 is a detail illustrating the pin and hole connection for causing accurate positioning of the belt; Fig. 11 is a development of the belt with the controlling ports therein; Fig. 12 is a detail illustrating an elevation of the mechanism for intermittently feeding the control belt in timed relation to the movements of the card cylinder; Fig. 13 represents a modification of the continuous stripping apparatus designed for the removal of similar strips from both the card and doffing cylinders; and Figs. 14 and 15 illustrate a side elevation and section, respectively, of an additional suction control designed in cooperation with the moving belt to more fully control the suction through the openings if necessary.

Referring to the illustrated embodiment of the invention as a whole with particular relation to the showing of Fig. 1, the usual lap is indicated at 20, supported upon a lap roll 22 from which the lap 23 is directed to a licker 24 through a feed roll 26. From the licker 24 the lap is drawn to the surface of the carding cylinder 28 and passes thereabout, being engaged by the series of flats 30 provided with the usual cleaning brush 32. The lap or web extending cross the surface of the carding cylinder is removed therefrom by the slower travelling doffer 34, from which it is withdrawn by the doffer combs 36, condensed at 38 and finally delivered by the calender rolls 40 to any convenient receptacle, all as will be evident to those skilled in the art.

The residual collection upon the carding cylinder, which is the area of principal occurrence, may be constantly removed by stripping mechanism indicated generally at 42, and to be more fully described hereinafter. As noted, this stripping mechanism is located adjacent the surface of the carding cylinder beyond the point of delivery to the doffer, and operated in timed relation to that of the carding cylinder through driving connections which may be conveniently taken from the doffer shaft.

As hereinbefore described, the method employed contemplates the removal of small increments of lap from the carding cylinder during the continuous operation of the latter without interference with the continuous delivery of a complete lap to and from the doffer. This removal of small increments of lap from the surface of the teeth of the card cylinder is best accomplished by the removal of successive narrow strips widely spaced from one another, and with sufficient opportunity for a complete build-up or fill in of the space or furrow from which the strip is removed before again operating upon the same or an adjacent space. Any attempt to force the stripping by the removal of too much material interferes with the proper formation and delivery of the completed lap, and for all practical purposes renders the card inoperative, particularly if the quantity of material removed approaches the quantities normally removed in the usual intermittent stripping during the same time interval.

Again referring to the drawings illustrating the invention, it will be observed on an inspection of Figs. 2 and 3 taken in conjunction with the showing of Fig. 1, that the card cylinder indicated at 28 and provided with comb teeth 44 has extended lengthwise thereof an elongated nozzle head 46 provided with a series of parallel and regularly spaced partitions 48 which form in effect a comb in close proximity to the working surface of the cylinder. This comb surface, which is fixedly mounted in close and exact relationship to the carding teeth and which extends lengthwise or axially of the cylinder, has at opposite sides thereof a casing wall 50 curving with the circumference of the cylinder, as indicated in Fig. 2. Underlying the comb and extending lengthwise is a hollow manifold 52, having a continuous slot 54 which registers with the under side of the spaces formed by the comb teeth or partitions. This manifold is yieldingly held in uppermost position by studs 56 yieldingly supported by coiled springs 58. The construction is so designed that the spaces between the partitions constituting separate and independent suction nozzles or openings are caused to become operative according to a prearranged pattern, each of these nozzles when operative withdrawing from the surface of the adjacent card cylinder the complete material lodged thereon in the form of a narrow band or section approximating the width of the nozzle opening or space.

The control of the nozzle action is conveniently accomplished in the illustrated embodiment of the invention by an endless belt advanced in step by step movement to successively bring into register with the appropriate nozzle opening a perforation in the belt which causes the opening when in registration to provide communication between the suction manifold 52 and such opening, and at the same time blank off all other openings. This belt, as indicated generally at 60, may be conveniently made of leather or reinforced rubber or other material, which may be accurately perforated and which will sufficiently seal those openings not in registration with the perforation in the belt. The belt is advanced to bring successive openings into registration by a motion which insures accuracy of registration, and in which the transfer from one opening to the next is sufficiently rapid to promptly cut off the opening in operation and provide complete registration of the following opening.

As indicated in Fig. 2, the belt travels at opposite ends over pulleys 62 and 64, one of which, as indicated at 66, is provided with teeth registering with a series of uniformly spaced perforations or openings 68 adjacent the edge of the belt. This belt is intermittently advanced, as will be more fully described hereinafter.

It is desirable from two standpoints to remove a minimum of collected fibre from the card cylinder at each step in the operation, first because the removal of such a minimum increment causes no interference with the delivery of the finished web, and second because the power required for removal of such an increment in the form of a narrow band or strip due to the reduced area of suction involves a minimum consumption of power for complete cleaning or stripping of the card teeth in the area of removal. I have developed by actual experiment that the removal of a strip or section of collected fibre on the order of $\frac{1}{16}$ of an inch in width is feasible, and may be continuously carried out without interference with the operation of the card and without producing an undue or abnormal quantity of waste material. The removal of a strip on this order requires approximately 125 successive operations to traverse the complete surface of a card cylinder of normal length, the operation requiring on the order of twenty minutes approximately.

With this method of stripping, the card continuously operates at maximum efficiency with the delivery of a web or sliver of consistently uniform density and weight, the stripping is accomplished with a minimum of power and not an undue amount of waste, which incidentally is in a loose and fluffy condition, and can be readily cleaned and returned for reuse. The effective time required for stripping the entire cylinder generally speaking is determined by the amount of product being put through the card. The dwell of the nozzle in operation should be only sufficient to completely strip the path subjected to suction, and thereafter the section should be shifted. With this arrangement the time required for complete stripping is the minimum required for each section multiplied by the number of sections of the entire card.

Again referring to the accompanying drawings, it will be noted that when the belt 60 registers with a fixed opening between partitions 48 and the slot in the manifold 52, a length of fibre is withdrawn from the card into the suction manifold approximating in width the space between the partition plates. To provide against withdrawal of fibre from portions of the lap adjacent the strip or furrow, the upper ends of the partition plates, as indicated in Fig. 4, extend upwardly to form slight projections 70, these parallel side plates preventing side pull or draft from fibres lying without the path of the nozzle itself.

Upon reference to Fig. 9 it will be noted that the nozzle head 46 terminates short of the complete length of the card clothed cylinder with the outer portion of the selvage located approximately as indicated in the drawings. With this arrangement the openings at opposite extreme ends of the nozzle bar or head operate directly upon the outer edges of the selvage and upon that portion of the card clothing beyond the edges of the selvage. As it is unnecessary to subject this area of card clothing to the direct effect of suction nozzles, the end wall 71 of the nozzle head is provided with a curved and cut-away face 73, which produces a certain amount of clearing drag upon the area of the card clothing beyond the selvage and in which a certain amount of accumulation may occur. It will be noted furthermore that in the construction as indicated, the width of furrow stripped at each step in the operation is substantially less than the width of the selvage, actually approximating one-half the width of the selvage. By confining the width of the stripped furrow to an amount substantially less than that of the selvage the continuity of the selvage is preserved at all times, the time element between successive stripping operations permitting sufficient build-up and accumulation in the previously stripped furrow to maintain edge continuity of the delivered lap during the period in which the outer or extreme edge portion of the selvage is being stripped or cleared.

The construction of nozzle shown in Figs. 6, 7 and 8 provides a slight modification effective to prevent engagement of fibres delivered by the feed to the stripped portion of the furrow and not removed in their entirety by the doffing cylinder, these fibres being carried beyond or by the point of doffing and requiring or at least making it desirable to clear them from the otherwise stripped furrow when shifting or changing the region of stripping by transfer from one nozzle to another. To this end the fixed plate 46 is provided with the openings in the direction of travel of the belt with a recess 72 which forms in effect a disengaging chamber in communication with the belt tending to free any fibres or collection of fibres engaged by the belt and carried along therewith, these fibres being discharged directly into the manifold 52 through a communicating chamber 74 when the opening in the belt registers with the chamber 72 to permit freeing of the fibres. This chamber is provided with a passage 76 to atmosphere by virtue of which the fibres are dislodged through the suction draft.

As stated previously, the control of the fixed nozzle openings is conveniently through an endless belt provided with openings or perforations according to a prearranged pattern, these openings in the intermittent travel of the belt accurately registering with and cutting in selected nozzle spaces lengthwise of the carding cylinder. The development of the belt is indicated clearly enough in Fig. 11, the width of the belt being sufficient to cause a complete bridging of the length of the card cylinder, and the successive series of openings being arranged to register appropriate nozzle openings for each advance of the belt itself. For convenience of understanding the openings are numbered, indicating their successive registration with nozzle spaces during the step by step advance of the belt. On inspection of the figures it will be noted that nozzle openings in proximity to the center of the lap are first brought into operation, and thence sections are removed progressing in opposite directions outwardly toward the edge or selvage of the lap. Successive sections removed at each side of the center line according to the indicated arrangement are spaced apart a width equivalent to approximately three sections, this continuing throughout one series of openings. In the succeeding series of openings each opening is staggered with relation to a similar opening in the next series, so that the operation is repeated, cleaning out the spaces between those in which sections were previously removed.

The intermittent or step-by-step advance of the control belt 60 is conveniently accomplished as indicated in Fig. 12. As shown therein, the shaft 80 of the doffer cylinder is provided with a pulley or wheel 82, having a dog 84 threadedly connected with the rim, as indicated, and serving during each complete revolution of the doffer shaft to impart an abrupt shift in the direction of the arrow to the arm 86 which is connected to the crank arm 88 through the pin and slot connection 90. The arm 86 slides in bearings 92 formed in a bracket 94, and is provided with an upstanding abutment 96 engaged by the dog 84. As indicated, engagement of the dog shifts the abutment and arm to the right against the action of the spring 98, the parts being returned to the position shown in Fig. 12 after the passage of the dog. This abrupt shifting movement causes a like movement of the crank arm 88 through generally the angle indicated at 100, which imparts partial rotation to the ratchet wheel 102 through the pawl 104 mounted upon the arm. The ratchet wheel is mounted upon a shaft 106 with the drive pulley 64, and serves to intermittently advance the control belt 60 in timed relation to the movement of the cylinder, as will be self-evident.

In the illustrated embodiment of the invention, the pawl and ratchet are so designed that each working movement of the pawl advances the ratchet wheel the equivalent of four teeth. As indicated, the engagement and the movement caused thereby is positive, causing exact registration of the slots in the belt with the suction openings. It will be noted that the pulley or wheel 82 is provided with an additional threaded opening 108, permitting the use of an additional dog with a doubling of the rate of step advance with the same speed of the cylinders.

Upon referring to Fig. 13 it will be noted that in the construction as illustrated for stripping both the carding and doffer cylinders simultaneously, if this be desirable or necessary, the method of continuously stripping small increments of the total gathered fibrous mat is followed as previously described, the employment of the belt and the method of advancing the belt controlling the operation of the suction openings is also as previously described, the essential difference residing in the shape of the suction head provided for causing the suction to bear upon the adjacent areas of the two cylinders. As indicated more particularly in the drawings, the carding and doffer cylinders are indicated at 28 and 34, respectively, and supported beneath the general intersection of the cylinder surfaces is a suction stripper head 110 which extends lengthwise of the cylinders, is generally triangular in cross-section as indicated, and is provided with a series of suction passages 112, each having oppositely directed branches 113 and 114 terminating in proximity to the surfaces of the carding cylinder and doffer cylinder, respectively. Supported beneath the suction head 112 is a suction trunk 116 having a continuous suction passage 118 therein, and interposed between the trunk and head and controlling communication successively between the individual passages 112 and the continuous passage 118 is a belt 120 passing over the pulleys 122, one of which may be driven, and perforated as described in connection with this belt to impose the necessary predetermined control upon the suction. This type of device will serve to continuously strip the two cylinders if necessary upon which accumulation takes place.

Although the method of cutting off the suction from each opening as stripping is advanced to the next opening through the action of the belt itself is entirely satisfactory, nevertheless there may be conditions under which it is desirable and more satisfactory to have additional means for curtailing suction independent of the control provided by the belt itself. To this end, as indicated in Figs. 14 and 15, I may provide within the suction trunk a revolving valve disk 130, having a peripheral portion 132 provided with spaced openings 134. As the disk is revolved these openings 134 successively register with the trunk conduit as will be evident, and between the openings suction is cut off regardless of the position of the controlling belt, as will be evident.

Referring more particularly to Fig. 14, it will be noted that the controlling disk which is mounted for convenience in a casing or housing 140, is provided with a driving gear 142 engaged by a large gear 144 mounted upon the shaft for driving the controlling belt so that the valve disk and belt move in timed relation. Means for producing an intermittent movement of the belt slightly different from those shown in Fig. 12 comprise a crank arm 144 with a pawl 145 engaging a ratchet 146, the crank arm being connected with and operated by a rod 148 connected with an eccentric 149 driven continuously through the gears 150 and 152 from the shaft of the doffer cylinder. With this construction the valve disk has imparted thereto an intermittent advancing movement in timed relation to the advancing movement of the controlling belt. By proper arrangement of the openings this advancing movement is caused to cut off the suction slightly in advance of the point at which the suction would be cut off by the moving control belt, and in consequence may on certain types of fibres provide a more effective control of the suction.

From the foregoing description it must be evident to those skilled in the art that by virtue of the continuous removal of a small portion of the fibrous mat amounting to less than one-hundredth part of the entire mat, and by shifting the section removed alternately to opposite sides of a center line, a balanced and uniform lap or web can be delivered by the apparatus. So long as the stripping operation continues to clear the card of a progressive accumulation, the delivery of this uniform balanced web by the card can be carried on indefinitely, or in other words, the stripping forms an intimate part of the card operation itself, and so complements this operation that the card is constantly maintained in a state of maximum efficiency, at least so far as fibre accumulation is concerned, and because of this constant condition of efficiency can for the first time perform its intended function without the constant influence of variable factors which have heretofore always been present.

It will be obvious to those skilled in the art that although a yielding belt is illustrated for the purpose of controlling the flow of suction, nevertheless any moving surface with openings properly disposed, and with means for adequately sealing and confining the flow of suction to the openings, is entirely acceptable for the purpose.

It will be further obvious to those skilled in the art that card stripping apparatus of the intermittent type is commonly provided with a central source of vacuum and accompanying receiver communicating with a plurality of stripper installations on cards. This apparatus must be of sufficient size and power to remove comparatively large quantities of fibre from the surface of a carding cylinder in the shortest practical period of time to avoid protracted shut-down of the apparatus. In the present type of apparatus which continuously removes a small increment of fibrous material, a much smaller vacuum source directly connected with the stripping apparatus or the nozzles on each card may be effectively employed, and although I have not shown such apparatus, which may be of standard construction, it will nevertheless be understood that a reduction in size and power of the vacuum source is a desirable advantage to be attained through this method of stripping, although the invention is in no sense limited to the method of producing a vacuum or its location with respect to the vacuum nozzles.

What is claimed is:

1. Means for stripping carding apparatus, which comprise a member located adjacent the surface of a card clothed cylinder and extending lengthwise thereof, the member being provided with a series of closely spaced and narrow suction openings, a suction conduit extending lengthwise of the cylinder and connected with all of the openings, means for inducing a continuous suction in the conduit, and means extending between and movable relative to the member with the suction openings and the suction conduit for automatically bringing successive openings into communication with the suction conduit in a predetermined manner as a result of movement of the said means.

2. Means for stripping carding apparatus, which comprise a member located adjacent the surface of a card clothed cylinder and extending lengthwise thereof, the member being provided with a series of fixed and closely spaced suction openings extending the length of the cylinder, a suction conduit connected with all of the openings, means for inducing a continuous suction therein, a surface having openings therein according to a predetermined pattern designed to register with and afford communication between the openings in the conduit, and means for moving the surface.

3. Means for stripping carding apparatus, which comprise a member located adjacent the surface of a card clothed cylinder and extending lengthwise thereof, the member being provided with a series of fixed and closely spaced suction openings extending the length of the cylinder, a suction conduit connected with all of the openings, means for inducing a continuous suction therein, a surface having openings therein according to a predetermined pattern designed to register with and afford communication between the openings in the conduit, and means for operating the surface intermittently with a dwell when an opening in the surface is in registration with a complementary suction opening.

4. Means for stripping carding apparatus, comprising a series of suction openings extending lengthwise of a card clothed cylinder, a suction conduit communicating with the openings, an endless belt having openings according to a predetermined pattern therethrough and intervening between the suction conduit and suction openings to cut off the suction openings except when an opening in the belt registers therewith, and means for advancing the belt intermittently and in timed relation to the operation of the card.

5. Means for stripping carding apparatus, comprising a series of suction openings extending lengthwise of a card clothed cylinder, a suction conduit communicating with the openings, an endless belt having openings according to a predetermined pattern therethrough and intervening between the suction conduit and suction openings to cut off the suction openings except when an opening in the belt registers therewith, the belt approximating in width the length of the card clothed cylinder and having openings extending thereacross, and means for advancing the belt in a path generally tangential to the surface of the card clothed cylinder 6. Means for stripping carding apparatus, comprising a series of suction openings positioned adjacent the surface of a card clothed cylinder and extending lengthwise thereof, a suction conduit communicating with the openings, a surface perforated according to a predetermined pattern and intervening between the conduit and openings to control communication therebetween, and means for moving the surface intermittently and in timed relation to the operation of the card clothed cylinder in a manner to bring successive suction openings into action without substantial dwell therebetween for the purpose of continuously removing during the productive operation of the card a cleared strip or band of fibrous material.

7. Means for stripping carding apparatus, comprising a hollow suction member extending lengthwise of a card clothed cylinder, a series of suction openings disposed uniformly throughout the length of the member and acting upon relatively narrow areas, partition members between adjacent openings to confine the suction to the narrow area in communication with each opening, a suction conduit, and means intervening between the suction conduit and openings for automatically controlling communication between the conduit and openings.

8. Means for stripping carding apparatus, comprising a series of suction openings extending lengthwise of a card clothed cylinder, a suction conduit communicating with all of the openings, a controlling surface having openings according to a predetermined pattern intervening between the suction openings and conduit, means for moving the surface transversely with respect to the conduit and openings to successively present openings in the surface, and means for approximately sealing the moving surface in a manner to confine the suction to the suction opening and conduit in communication therewith.

9. Means for stripping carding apparatus, comprising a series of suction openings extending lengthwise of a card clothed cylinder, a suction conduit communicating with all of the openings, a controlling surface having openings according to a predetermined pattern intervening between the suction openings and conduit, means for moving the surface transversely with respect to the conduit and openings to successively present openings in the surface, and means for by-passing a portion of the fibrous stream in the direction of movement of the surface as the latter is advanced from one opening to the next.

10. Means for stripping carding apparatus, comprising suction openings located adjacent the surface of a card clothed cylinder, a suction conduit communicating therewith, an endless belt having openings therein intervening between the suction openings and conduit, means for intermittently moving the belt to present successive openings therein into communication with the suction openings, and means cooperating with the belt for insuring a predetermined position thereof upon each advancing movement and registration of the openings.

11. Means for stripping carding apparatus, comprising a comb strip extending lengthwise of a card clothed cylinder and forming a uniform series of narrow suction openings, means for supporting the comb strip in close and fixed relationship to the surface of the cylinder, a hollow suction conduit having a slot extending lengthwise thereof and embracing the entire series of suction openings, a belt surface intervening between the suction comb and conduit and movable transversely thereof, the surface having a predetermined arrangement of openings arranged to provide successive communication between the openings and slotted conduit upon movement of the belt, means for intermittently advancing the belt, and means for yieldingly urging the suction conduit toward the comb to engage and press the belt therebetween.

12. Means for stripping carding apparatus, comprising suction openings extending lengthwise of the card clothed cylinders, a conduit communicating with the openings, an endless belt having openings according to a predetermined pattern intervening between the conduit and openings, and means for operating the belt in timed relation to the operation of the card.

13. Means for stripping carding apparatus, comprising a series of suction openings extending lengthwise of a card clothed cylinder, a suction conduit communicating with the openings, a moving surface having openings according to a predetermined pattern intervening between the conduit and suction openings to cut off the openings except when an opening in the surface registers therewith, a suction cut-off valve, and means for operating the valve and moving surface in timed relation to the operation of the card.

14. Means for stripping carding apparatus, comprising a series of suction openings extending lengthwise and adjacent to the card clothed cylinder, the openings terminating short of the opposite edges of the cylinder, means for causing the openings at opposite extreme ends of the series to exert a clearing drag beyond the selvage edges of the fibrous web without approximating complete stripping or clearing action, and means for rendering the openings successively operative to successively strip or clear furrows in the fibrous web in general register with the operative opening.

15. The method of stripping carding apparatus, which consists in removing from a card clothed cylinder without interruption to the continuity of the on-coming feed of fibre thereto, a comparatively narrow furrow of fibres, changing the area from which fibre is removed, and by-passing carried-by fibre stock which is in transit at the period of change.

16. A method of stripping carding apparatus so as to assure, during the entire period of normal productive operation of the apparatus, the constant production of a lap or web of consistently uniform weight, which comprises continuously removing from a card clothed cylinder a lap or web, and continuously removing from the same cylinder successive small increments of the accumulated waste textile fibers, the successively removed increments progressively advancing from an area midway between the ends of the cylinder outwardly in opposite directions toward the ends of the cylinder, the rate of removal of the increments and the relation each increment bears to the total amount of accumulated waste fibers being such as to continuously maintain the waste at an efficient lap or web producing thickness but to never accomplish complete stripping of the cylinder.

WILLIAM H. GOLDSMITH, Jr.